F. T. DOW.
PROCESS OF TREATING PEAT AND SIMILAR SUBSTANCES.
APPLICATION FILED OCT. 24, 1919.

Patented Oct. 11, 1921.

Inventor.
Fred T. Dow
by Heard Smith & Tennant.
Attys.

UNITED STATES PATENT OFFICE.

FRED T. DOW, OF BANGOR, MAINE.

PROCESS OF TREATING PEAT AND SIMILAR SUBSTANCES.

1,393,435.     Specification of Letters Patent.     Patented Oct. 11, 1921.

Application filed October 24, 1919. Serial No. 332,912.

*To all whom it may concern:*

Be it known that I, FRED T. DOW, a citizen of the United States, residing at Bangor, county of Penobscot, State of Maine, have invented an Improvement in Processes of Treating Peat and Similar Substances, of which the following description, in connection with the accompanying drawing, is a specification, like characters on the drawing representing like parts.

This invention relates to a novel process for treating peat and similar substances which contain water for the purpose of facilitating the extraction of the moisture therefrom preparatory to subsequent treatment of the material for the purpose of briqueting it.

The process is especially adapted for use in treating peat, and for this reason I will describe it as it would be thus used, although it is equally applicable for treating other substances, either animal, vegetable or mineral, for the purpose of extracting moisture therefrom.

In applying my process to the treatment of peat, I first drain the water from the peat by the action of gravity. This may be done in various ways depending on the location and character of the peat bog. If the bog is one which can be drained the easiest way of draining the water from the peat by gravity would be to drain the bog. If, on the other hand, the bog is one which cannot be readily drained, then the peat may be removed from the bog and deposited on high ground in a position so that the water will drain therefrom by gravity. After the water has been allowed to drain from the peat by gravity for a suitable length of time, I propose to force air or other drying medium under pressure through the drained peat mass while in its normal uncompressed condition. This forcing of air or other drying medium through the peat mass operates both to loosen up the latter so that any free water which has been confined therein may more readily drain out, and to cause an evaporation of moisture therefrom.

After the air or other drying medium has been forced through the peat mass for an appropriate length of time, I then propose to draw air or some other suitable drying medium through the loosened peat mass by suction. This operation results in further extracting moisture from the mass. After these steps have been continued alternately for a suitable length of time the free water will be entirely removed from the peat mass and the latter will be partially dried and it will then be in condition to be ground or macerated or otherwise treated preparatory to being dried and briqueted.

The drying medium may be first forced through the peat mass thereby loosening it up and then drawn by suction through the loosened mass in any suitable way. Merely as a matter of illustration, I have shown in the drawings more or less diagrammatically devices for this purpose.

Figure 1:
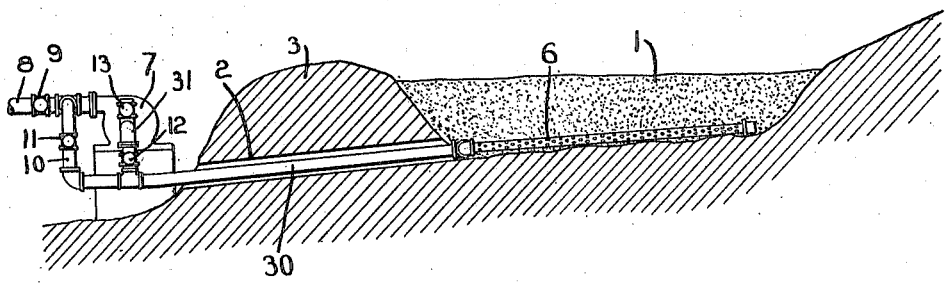
Figure 1 is a sectional view showing a peat bog which can be drained *in situ* and which is provided with means for carrying out my method of extracting the moisture from the peat.

Referring first to Fig. 1, 1 indicates a peat bog which is situated so that it can be readily drained by gravity merely by forming a drain 2 through the earth 3 at one side of the bog. The digging of this drain 2 will allow the water in the peat 1 to drain out by gravity.

Figure 2:
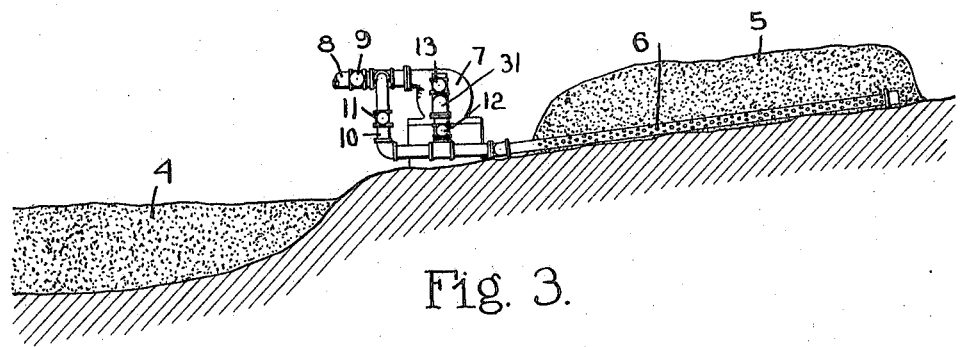
Fig. 2 shows a sectional view of a bog which cannot be drained, said figure showing the peat placed on high ground for the purpose of being drained.
Figure 3:
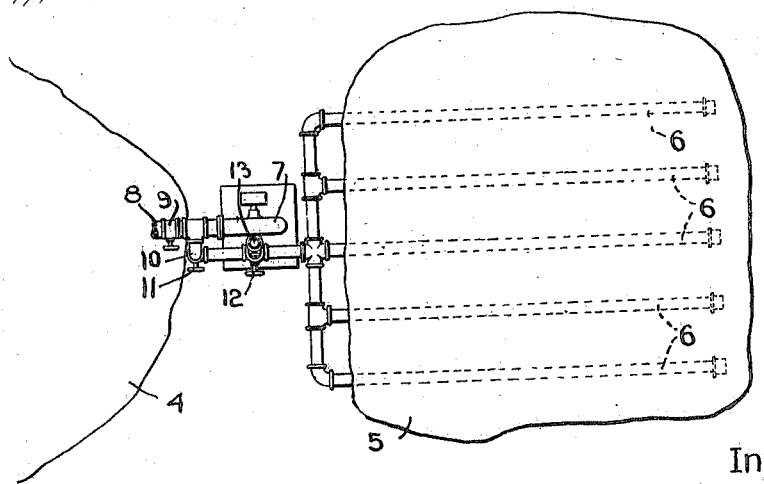
Fig. 3 is a plan view of Fig. 2.

In Fig. 2 the peat bog 4 is located so that it cannot be readily drained by gravity and in this case the draining of the peat is accomplished by digging the peat from the bog and placing it in a pile 5 on high ground.

As stated above, my improved process consists in forcing air or some other drying medium through the drained peat after the free water has been allowed to drain therefrom by gravity for a predetermined length of time, and while this forcing of the drying medium into and through the drained peat may be accomplished in various ways, I will preferably employ a plurality of perforated pipes or ducts 6 which are embedded in the drained peat and which are connected to some suitable apparatus by means of which the drying medium can be blown through the pipes or ducts.

The pipes 6 may be introduced into the bed of peat 1 in any suitable way. Under some circumstances they might be thus introduced through the drain 2. Any number of these pipes may be employed and they may be located as close together as desirable. The pipes are shown as connected by a pipe 30 to a blower or air-forcing device 7 which will preferably be arranged so that it can be used either to blow air through the pipes or to create suction in said pipes. This dual function of the apparatus 7 may be provided for by connecting it as shown, that is, by connecting the inlet thereof to the pipe 30 by a pipe connection 31 and providing said connection with a valve 12 and also with a valved inlet 13 leading to the atmosphere, and by connecting the discharge pipe 8 to the pipe 30 by a by-pass connection 10 having a valve 11 therein, and by placing a valve 9 in the discharge pipe 8. If the valves 12 and 9 are closed and the valves 13 and 11 are open, then the device 7 will draw air through the opening 13 and force it through the by-pass 10 and pipe 30 into the perforated pipe 6. On the other hand, if the valves 13 and 11 are closed and the valves 12 and 9 are open, then the device when operated will draw air through the valve 13 and discharge it through the pipe 8, thus producing suction in the perforated pipes 6. This arrangement of air-forcing apparatus, however, is used only to illustrate the idea of a device capable of either forcing air through the pipes 6 or producing suction therein and any apparatus which will accomplish this object may be used without affecting the invention.

In the construction shown in Fig. 2 the perforated pipes 6 will preferably be laid along the ground on which the peat 5 is piled so that the pile of peat is resting on the perforated pipes. In the arrangement shown in Fig. 2 the pipes 6 will also be connected to a suitable blower 7 which will preferably be of such a type that it can be used either as an air-forcing apparatus or as a suction apparatus.

After the water has been allowed to drain by gravity from the peat for a suitable length of time, then the blower 7 is operated to force air through the perforated pipes 6 with the result that the air which is delivered from the pipes 6 will be forced through the drained peat (shown at 1 in Fig. 1 and at 5 in Fig. 2), thus loosening up the peat mass. This loosening of the peat by the forcing of air therethrough allows any added water which may be trapped in the mass to be drained out by gravity. The movement of the air through the peat also serves to extract moisture from the peat and assist in draining the latter somewhat.

After the air has been forced through the pipes for a suitable length of time, then the operation is reversed and a suction or vacuum condition is established in the pipes, so that air will be drawn down through the loosened peat mass and through the pipes. If during the operation of drawing air down through the loosened peat mass into the pipes, the peat tends to clog up the pipes, then the air current will be reversed and air will be blown through the pipes and through the peat mass thereby to loosen it up again. This operation of blowing air through the pipes and then sucking air down through the loosened peat mass may be continued as long as necessary to dry the peat the desired amount. It is within my invention to alternate the blowing of the air through the peat and sucking of the air down through the loosened peat mass as many times as necessary to accomplish the desired end. Where the air-forcing apparatus 7 is of the reversible type this suction or vacuum condition can be produced in the pipes by using the device 7 as a suction apparatus. The drawing of air through the loosened peat assists still further in draining it and removing any surplus water so that after this operation has been continued for a suitable length of time all surplus water will be removed from the peat and the peat will be in proper condition to be ground, macerated or otherwise treated preparatory to being further dried and briqueted.

My invention provides a relatively inexpensive method for treating peat to remove the surplus water therefrom and to reduce it to a semi-dried condition. If desired the perforated pipes may be provided with screens to prevent the peat from being drawn into the perforations while the air is being sucked through the pipes.

In carrying out the invention the perforated pipes or ducts 6 may be in the nature of metal pipes or may be concrete ducts or conduits, of any description, especially when the process is carried out in accordance with the construction shown in Fig. 2 wherein the pipes or conduits are on the surface of the ground. Under such conditions these pipes or conduits might be permanent concrete conduits if desired. The character of the pipes or conduits, however, does not enter into the invention.

While under ordinary circumstances, the drying medium which is forced through the material to be dried to loosen it up and is afterward drawn through said material by suction will be air either heated or at the natural temperature, yet the invention also contemplates the use of any suitable drying medium other than air which will accomplish the desired end.

While I have herein described my process as used in the treatment of peat, yet I desire to state that the process is not confined in any way to the drying of peat, but can be used for drying, curing or treating various vegetable, mineral or animal substances.

I claim:

1. The process of treating material saturated with water to extract moisture therefrom which consists in draining the water from the material by gravity, and alternately forcing a drying medium under pressure through the material to be treated to loosen it up and then drawing a drying medium by suction through said loosened material.

2. The steps in the process of treating peat which consist in draining the water from the peat by gravity, introducing perforated conduits into the peat mass, forcing a drying medium under pressure through said conduits thereby to loosen up the peat and then drawing a drying medium by suction through said conduits while they are still introduced into the peat mass.

3. The steps in the process of treating peat which consists in first draining the water from the peat by gravity, then forcing a drying medium under pressure through the peat while in its natural uncompressed state thereby to loosen up the peat mass and afterward drawing a drying medium by suction through said loosened mass.

4. The process of treating peat which consists in draining the water from the peat by gravity, alternately forcing air through the drained peat to loosen it up and partially dry it and drawing air through the loosened peat in a direction opposite to that in which it was forced through the peat.

5. The process of treating peat which consists in draining the water from the peat by gravity and then forcing air first in one direction and then the other through the drained peat.

In testimony whereof, I have signed my name to this specification.

FRED T. DOW.